United States Patent [19]
Doane et al.

[11] Patent Number: 5,987,161
[45] Date of Patent: Nov. 16, 1999

[54] APPARATUS AND METHOD FOR IDENTIFYING DEFECTIVE OBJECTS

[75] Inventors: Dennis Lee Doane, Dallas; Rajiv Roy, Plano; Charles K. Harris, Dallas; Joe Douglas Woodall, Euless; Thomas J. Doty, Dallas, all of Tex.

[73] Assignee: Texas Instruments Incorporated, Dallas, Tex.

[21] Appl. No.: 08/269,293

[22] Filed: Jun. 30, 1994

[51] Int. Cl.⁶ .................................................. G06K 9/00
[52] U.S. Cl. ............................................ 382/149; 382/145
[58] Field of Search .................................. 382/141, 142, 382/145, 143, 149; 356/240

[56] References Cited

U.S. PATENT DOCUMENTS

| | | | |
|---|---|---|---|
| 4,532,650 | 7/1985 | Wihl et al. | 382/144 |
| 4,608,709 | 8/1986 | Hedler et al. | 382/142 |
| 4,794,646 | 12/1988 | Takeuchi et al. | 382/144 |
| 5,095,204 | 3/1992 | Novini | 356/240 |
| 5,214,713 | 5/1993 | Juvinall | 382/142 |
| 5,305,391 | 4/1994 | Gomibuchi | 382/142 |
| 5,369,713 | 11/1994 | Schwartz et al. | 382/142 |
| 5,392,359 | 2/1995 | Futamura et al. | 382/141 |

Primary Examiner—Jose L. Couso
Assistant Examiner—Anh Hong Do
Attorney, Agent, or Firm—Alan K. Stewart; Wade James Brady, III; Richard L. Donaldson

[57] ABSTRACT

A device (10) identifies a defective object (12) from an image of the object (12) stored as pixel data in a pixel-data memory (52, 54, 56, 58). An inspection-point memory (72, 74, 76, 78) stores inspection-point data for the object (12). The inspection-point data represents inspection points (122, 124, ... ) that are arranged in circuital (112, 136) and transverse (110) groups, where member inspection points of the circuital groups (112, 136) are also members of different ones of the transverse groups (110). A program memory (84) stores a program, which is executed by a processor (64, 66, 68, 70). The processor (64, 66, 68, 70) identifies which of the pixel data correspond to the inspection-point data, calculates differences between values of the corresponding pixel data within the circuital groups (112, 136), identifies a deviant pixel (116) if one of the differences exceeds a first threshold, calculates gradients of values of the corresponding pixel data within the transverse group (110a) including the deviant pixel and within at least one other transverse group (110b, 110c), and determines whether the gradients of the transverse group (110a) differs by more than a second threshold from the gradient of the other transverse group (10b, 10c).

20 Claims, 5 Drawing Sheets

APPARATUS AND METHOD FOR IDENTIFYING DEFECTIVE OBJECTS

CROSS-REFERENCE TO RELATED APPLICATIONS

This application is related to U.S. application Ser. No. 08/235,034 (TI-15127) filed Apr. 28, 1994 by Dennis Lee Doane and entitled "Device and Method For Acquiring Substantially Centered Images of Moving Items", pending.

TECHNICAL FIELD OF THE INVENTION

The present invention relates generally to electronic devices and more specifically to devices for inspecting containers for defects.

BACKGROUND OF THE INVENTION

It is often desirable to inspect containers, such as aluminum beverage cans, for defects and to identify defective containers before they are filled and sealed. Today's automated processing equipment can fill and seal containers at speeds of approximately 1800 containers per minute. Although manual inspection is possible, it is slow and expensive and provides opportunities for the containers to incur damage during the interim between inspection and processing. Therefore, engineers have developed systems that automatically inspect each container shortly before it is delivered to the processing equipment.

One type of automatic inspection device illuminates the interior of each container as it passes on a conveyor and acquires multiple images of the interior. The device converts each image into pixels and each pixel into a digital value, which is stored in an image buffer. A processor then executes an algorithm that both determines which pixels to inspect for defects and inspects those pixels. When a defect is detected, the device removes the defective container from the conveyor.

Because the processor must execute the lengthy inspection-pixel algorithm for the multiple images of each container, the device cannot inspect containers with the desired pixel resolution while operating at the desired speed. Thus, there is a trade off between inspection resolution and speed. Also, one portion of the interior may have a different reflectivity than another portion. In order to prevent image saturation, each camera's sensitivity is set to accommodate the highest expected reflectivity. Thus, the defect sensitivity of the device for an interior portion having a lower reflectivity may be less than that for a portion having a higher reflectivity. Additionally, different types of containers may have interiors with different average reflectivities. Thus, a technician may have to manually calibrate the sensitivity of each camera between processing runs of different types of containers.

SUMMARY OF THE INVENTION

One aspect of the present invention is a device for identifying a defective object from an image of the object stored as pixel data in a pixel-data memory. An inspection-point memory stores inspection-point data for the object. The inspection-point data represents inspection points that are arranged in circuital and transverse groups. A program memory stores a program, which is executed by a processor. The processor identifies which of the pixel data correspond to the inspection-point data, calculates differences between values of the corresponding pixel data within the circuital groups, identifies a deviant pixel if one of the differences exceeds a first threshold, calculates gradients of values of the corresponding pixel data within the transverse group including the deviant pixel and within at least one other transverse group, and determines whether the gradients differ by more than a second threshold.

A first advantage of the present invention is that it can inspect objects with the desired resolution and at the desired speed.

A second advantage provided by another aspect of the present invention is that it can compensate for the reflectivity differences between portions of an object.

A third advantage provided by yet another aspect of the present invention is that it can automatically adjust the sensitivity of the imaging assembly according to the average reflectivity calculated over a plurality of objects.

DETAILED DESCRIPTION OF THE INVENTION

The preferred embodiment of the present invention and its advantages are best understood by referring to FIGS. 1–5 of the drawings, like numerals being used for like and corresponding parts of the various drawings.

Figure 1:
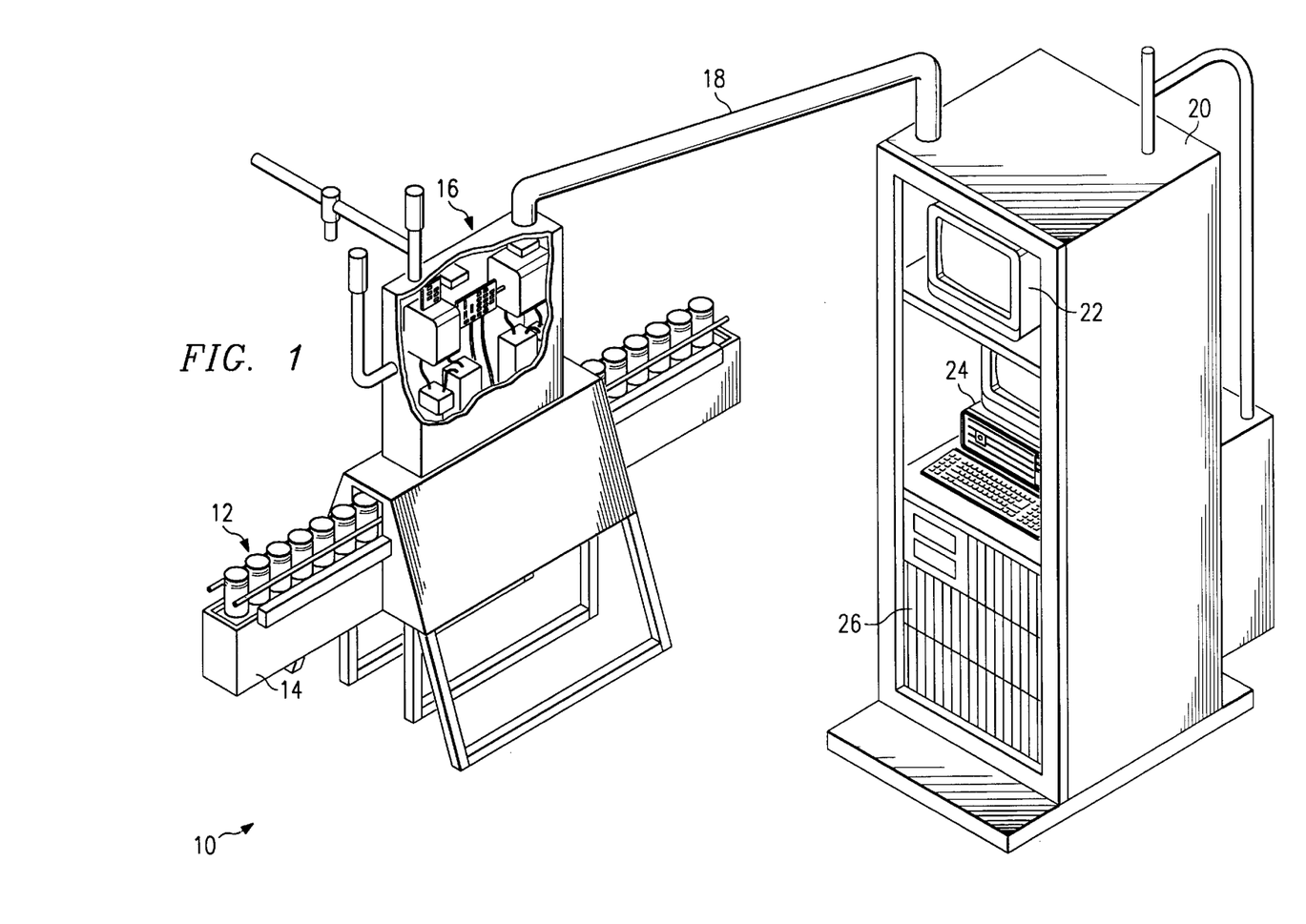
FIG. 1 shows a system for automatically inspecting containers and identifying defective containers.

FIG. 1 shows a system 10 for automatically inspecting containers 12 and identifying those that are defective. In this embodiment, containers 12 are aluminum beverage cans, although the invention contemplates the inspection of any type of object that may be concave, flat, or convex. System 10 includes a conveyer 14, which moves a stream of cans 12 within the view of an imaging assembly 16. Imaging assembly 16 is coupled via an electrical coupling conduit 18 to a processing station 20. Processing station 20 includes a vision monitor 22, an operator control terminal 24, and a processing unit 26.

In operation, conveyer 14 moves cans 12 beneath imaging assembly 16. In one embodiment of the invention, conveyer 14 moves cans 12 at a speed of approximately 1800 cans per minute. Imaging assembly 16 acquires an image of the interior of each container 12, and the acquired image is transmitted via conduit 18 to processing unit 26 of processing station 20. Processing unit 26 processes the image to identify in the interior of a corresponding can 16 any defects such as dents, stains, or the presence of a foreign material.

If processing unit 26 detects a defect in the can 16, it activates a reject mechanism 88 (FIG. 2) to remove the can from conveyor 14 before the can 16 is processed. Reject mechanism 88 is located along conveyer 14 between imaging assembly 16 and the processing equipment (not shown). In one embodiment of system 10, reject mechanism 88 includes a valve that releases a blast of compressed air to blow the defective can off of conveyer 14 and into a collection means (not shown) such as a box or dumpster.

An operator (not shown) may via terminal 24 direct processing unit 26 to display on monitor 22 an image of a can 12 interior. For example, the operator may wish to view an interior in which processing unit 26 detected a defect.

Figure 2:
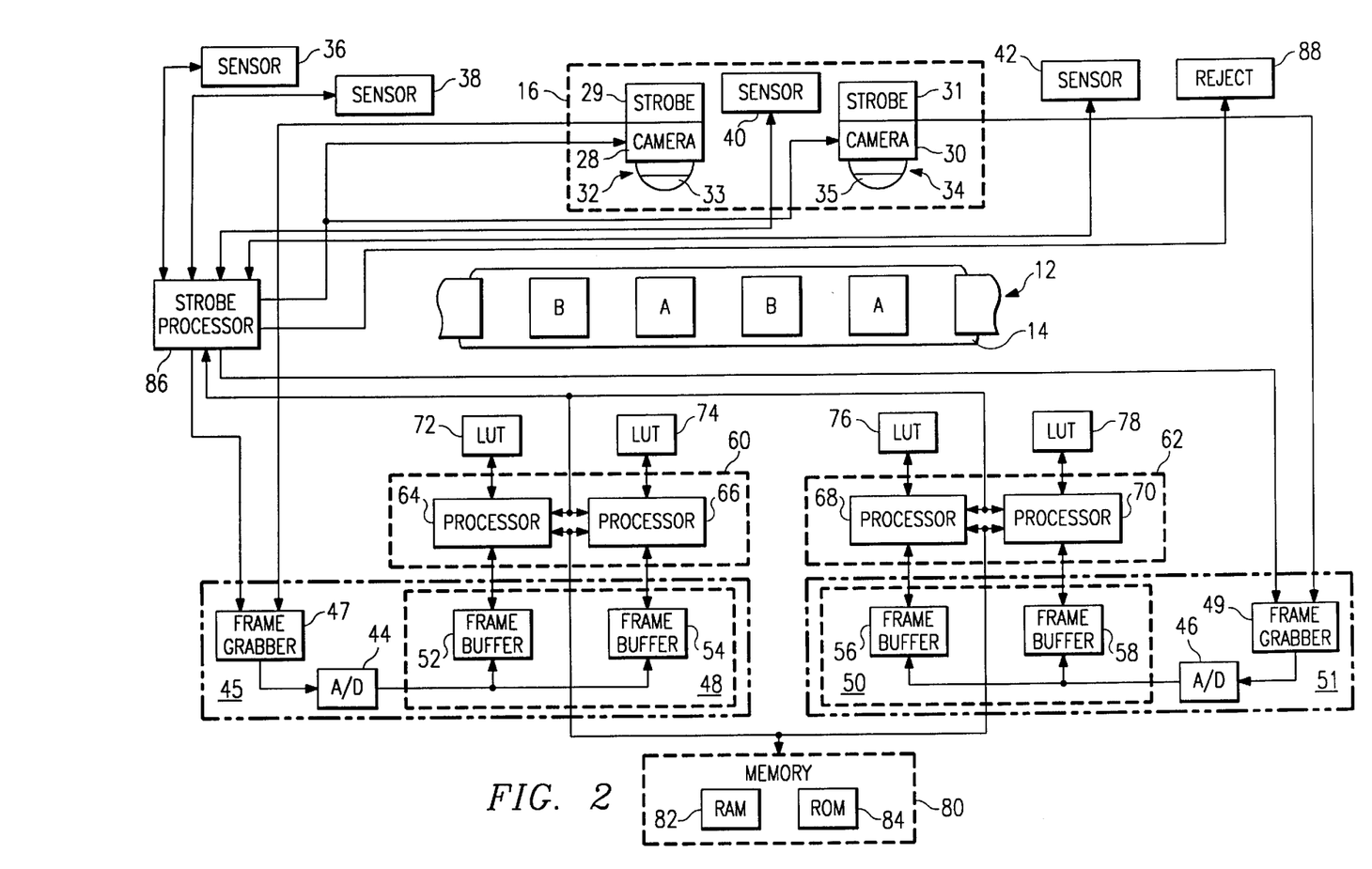
FIG. 2 is a schematic block diagram showing portions of the circuitry and some of the components of the processing unit and imaging assembly of FIG. 1.

FIG. 2 is a schematic block diagram showing portions of the circuitry and some of the components of processing unit 26 and imaging assembly 16 of FIG. 1. Imaging assembly 16 includes cameras 28 and 30, corresponding white-light strobes 29 and 31, and corresponding fish-eye lenses 32 and 34. Fish-eye lenses 32 and 34 may have disposed thereon neutral density filters 33 and 35. Cameras 28 and 30 acquire images of the interiors while cans 12 are within the imaging views of cameras 28 and 30. Each camera 28 and 30 typically includes a charge-coupled device (CCD) (not shown) for acquiring the image as a plurality of analog pixels. As described below, each camera 28 and 30 acquires an image from the interior of every other can 12. Thus, cameras 28 and 29 evenly split the acquiring task to increase the speed of system 10. In other embodiments, imaging assembly 16 may include more or fewer cameras 28 and 30. The more cameras included, the greater the inspection speed at which system 10 can operate.

Optical sensors 36, 38, 40 and 42 provide data from which strobe processor 86 can calculate the positions of the cans 12 entering and exiting imaging assembly 16. Strobe processor 86 uses this positional information to fire strobes 29 and 31 and to activate reject mechanism 88 at the appropriate times. A strobe 29 or 31 illuminates a can 12 interior when the can is within the view of a corresponding camera 28 or 30 to allow the corresponding camera to acquire an image of the can's interior.

After an image is acquired by camera 28, strobe processor 86 instructs storage circuit 45 to store the image as a plurality of pixels. Specifically, strobe processor 86 instructs frame grabber 47 to couple to analog-to-digital converter (ADC) 44 the video frame containing the acquired image. ADC 44 converts each analog pixel to a digital pixel value that represents the relative brightness of the pixel. To form a digital image, each pixel value is then mapped as a digital pixel in a buffer bank 48, which includes buffers 52 and 54. A processor bank 60, which includes processors 64 and 66, inspects the can 12 interior by searching for can defects recorded in the digital image using look-up-tables (LUTs) 72 and 74, as described below.

In similar fashion, after an image is acquired by camera 30, strobe processor 86 instructs storage circuit 51 to store the image as a plurality of pixels. Specifically, strobe processor 86 instructs frame grabber 49 to couple to ADC 46 the video frame containing the acquired image. ADC 46 converts each analog pixel to a digital pixel value. To form a digital image, each pixel value is then mapped as a digital pixel in a buffer bank 50, which includes buffers 56 and 58. A processor bank 62, which includes processors 68 and 70, inspects the can 12 interior by searching for can defects recorded in the digital image. Processor bank 62 performs this search according to inspection points stored in LUTs 76 and 78.

A memory 80 is coupled to each processor 64–70 and includes a random access memory (RAM) 82 and a read only memory (ROM) 84 for storing instructions for processors 64, 66, 68, and 70.

In operation, strobe processor 86 fires strobes 29 and 31 such that camera 28 acquires the images of the interiors of cans 12 marked with an "A" and camera 30 acquires the images of interiors of cans 12 marked with a "B". For simplicity of discussion, only the operation of camera 28 and its associated circuitry are discussed, it being understood that camera 30 and its associated circuitry operate in a similar fashion.

Before operation begins, LUTs 72 and 74 are loaded with predetermined inspection points that identify to processors 62 and 64 inspection pixels within the image stored in buffers 52 and 54. In this embodiment, the same inspection points are stored in LUTs 72, 74, 76, and 78. Strobe processor 86 processes position data from sensors 36–42, and according to this data, fires strobe 29 when a can labeled "A" is within the view of camera 28. Fish-eye lens 32 optically converts the three-dimensional image of the vertically-oriented (with respect to camera 28) can into a two-dimensional image. Camera 28 then acquires the analog pixels that compose this two-dimensional image. As described above, frame grabber 47, in response to a signal from strobe processor 86, couples these pixels to ADC 44, which converts these analog pixels into digital values. These values are mapped into buffers 52 and 54 such that the same digital image is stored in buffers 52 and 54.

To reduce inspection time, each processor 64 and 66 respectively inspects approximately one-half of the images stored in buffers 52 and 54. In this embodiment, processor 64 inspects the upper half of the image stored in buffer 52, and processor 66 simultaneously inspects the lower half of the same image stored in buffer 54.

Before they begin inspecting, processors 64 and 66 align the images stored in buffers 52 and 54 with the image outlined by the inspection points stored in LUTs 72 and 74. The need for this alignment arises from the possibility that the can 12 was not centered with respect to the view of camera 28 when the image was acquired. If the can was not centered with respect to camera 28, then the image will not be centered within buffers 52 and 54. (The CCD in camera 28 and buffers 52 and 54 are large enough to accommodate a can 12 that is off center by a maximum expected amount.) Processors 64 and 66 accomplish this alignment by executing an edge detection algorithm to detect the edges of the images stored in buffers 52 and 54 and to align these edges with the edge of the image outlined by the inspection points stored in LUTs 72 and 74. This alignment is discussed in more detail below in conjunction with FIG. 4.

Once the stored images are aligned, processor 64 identifies the pixels in buffer 52 that correspond to the inspection points stored in LUT 72 associated with the upper half of the can interior. Likewise, processor 66 identifies the pixels in buffer 54 that correspond to the inspection points stored in LUT 74 associated with the lower half of the can interior. Thus, not every pixel of the image is inspected, but only those inspection pixels corresponding to the predetermined inspection points. Furthermore, an advantage provided by LUTs 72 and 74 is that the inspection points need not be calculated by processors 64 and 66 for each can 12 that they inspect. The elimination of this calculation results in a tremendous savings of processing time.

Once processors 64 and 66 each identify their inspection pixels, processor 64 inspects its inspection pixels starting slightly below the halfway mark of the interior and continuing to the top. Processor 66 inspects its inspection pixels starting at the bottom of the interior and continuing to slightly beyond the halfway mark. Thus, processors 64 and 66 each inspect about half of the total number of inspection pixels. This split processing saves additional processing time. The inspection overlap at the halfway mark assures that the whole can interior is inspected. The error detection algorithm is discussed below in conjunction with FIGS. 5–7.

If either processor 64 or 66 detects a defect, it signals strobe processor 86, which in turn activates reject mechanism 88 at the appropriate time to remove the defective can 12 from conveyer 14.

Optional neutral density filters 33 and 35 are preformed to compensate for expected brightness differences between different interior portions of each can 12. Portions of filters 33 and 35 reduce the amount of light received from the interior portions that are more reflective, i.e., brighter, than other portions. Thus, cameras 28 and 30 perceive all interior portions to be of relatively equivalent brightnesses. This compensation allows the brightness sensitivities of cameras 28 and 30 to be set for maximum resolution of the darker portions while preventing the brighter portions from exceeding the maximum brightness limits of, i.e., saturating, cameras 28 and 30.

Figure 3A:
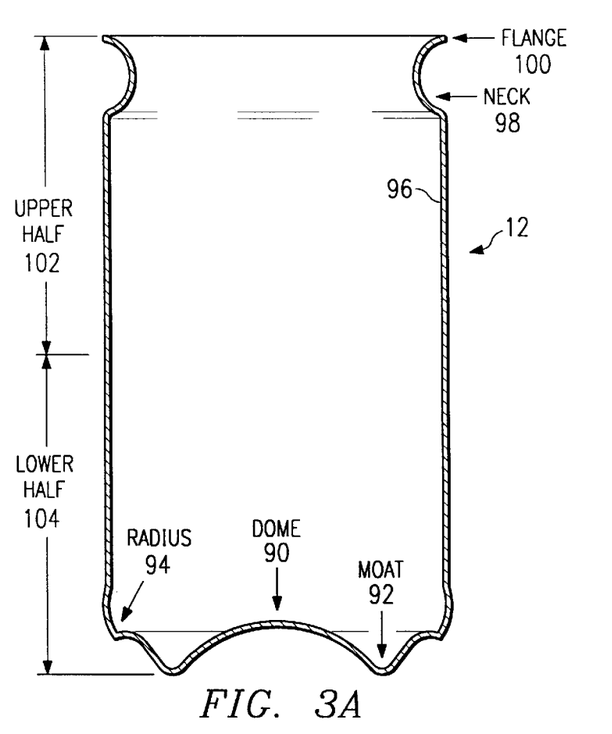
FIG. 3A is a cross-sectional view of an aluminum beverage can.

FIG. 3A is a cross-sectional view of a typical aluminum beverage can 12. Can 12 includes a dome 90, a mote 92, a radius 94, a sidewall 96, a neck 98 and a flange 100. Can 12 is conceptually divided into an upper half 102 and a lower half 104.

Figure 3B:
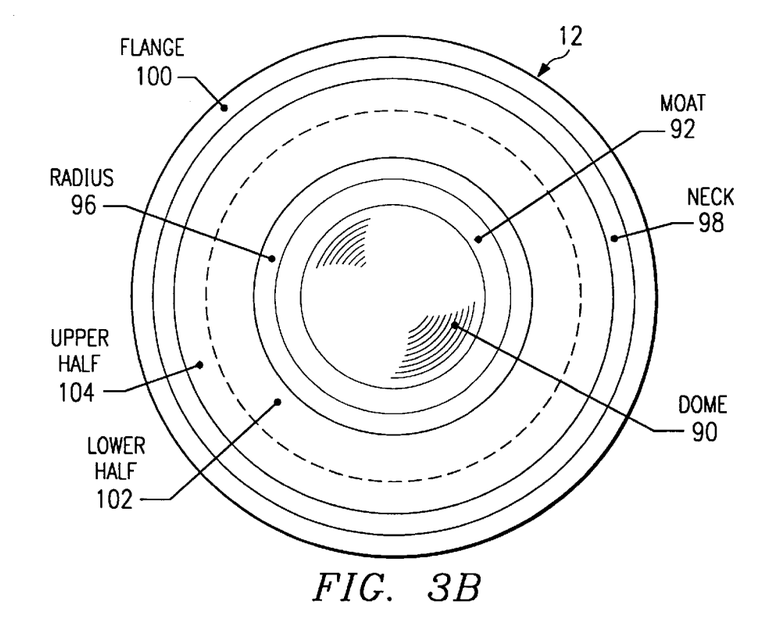
FIG. 3B is a two-dimensional map of the FIG. 3A beverage can.

FIG. 3B shows sections 90–104 as they appear when the two-dimensional image of a can 12 interior is stored in buffers 52–58. Generally, fish-eye lenses 32 and 34 impart to the image a positive optical resolution gradient beginning from the bottom of the interior and proceeding toward the top. That is, generally, the upper portions of the interior are acquired and stored with greater optical resolution, i.e., magnification, than the lower portions. However, an image of neck 98, which cameras 28 and 30 view at an angle, is acquired with a slightly reduced resolution because of this angle. The same is true for portions of radius 94, dome 90, and mote 92.

Figure 4:
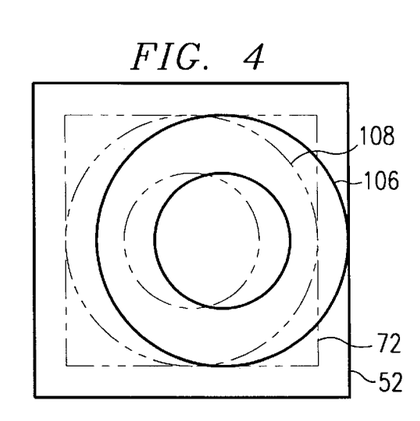
FIG. 4 shows an acquired image that is misaligned with respect to an image outlined by stored inspection points.

FIG. 4 shows the outline of a misaligned image 106 stored in buffer 52 overlaying a centered image 108 outlined by the inspection points stored in LUT 72. In order to identify the inspection pixels of image 106, processor 64 aligns image 106 with image 108. Processor 64 first finds the edges of images 106 and 108, and then aligns these edges with each other. Processor 64 accomplishes this aligning either by repositioning the pixel values within buffer 52 so as to move image 106 into proper alignment, or by mathematically determining which pixels correspond to the inspection points without physical repositioning. Although alignment is discussed with reference to processor 64, the same procedure is used by processors 66, 68, and 70.

Figure 5:
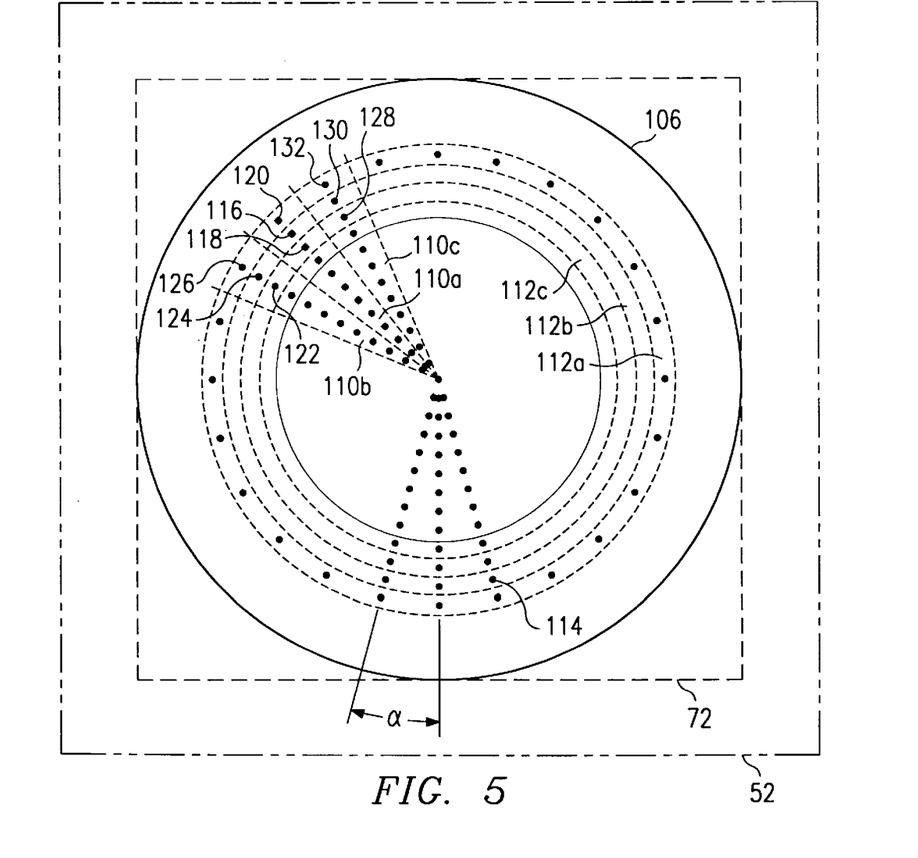
FIG. 5 shows a pattern of inspection pixels for the acquired image of FIG. 4.

FIG. 5 is an example of a pattern of inspection pixels for image 106 of FIG. 4 that corresponds to the inspection-point data stored in LUTs 72, 74, 76, and 78. This pattern corresponds to the pattern of inspection points stored in LUT 72 and outlining image 108. For clarity of illustration, image 106 is shown physically aligned with image 108 and it is assumed that all the inspection pixels of interest lie in the upper half of the interior. Thus, in this example, processor 64 relocated pixel values to center image 106 within buffer 52. However, this discussion applies regardless of the alignment technique used by processor 64. The inspection pixels are arranged in both radial groups 110 and annular groups 112. Radial groups 110 lie along radii of images 106 and 108 and are spaced an angle a apart. Each inspection pixel of a radial group 110 also lies within an annular group 112.

Processor 64 determines the difference between each pair of inspection pixel values within each annular group 112 in upper half 102 of the interior. Likewise, processor 66 does the same for annular groups 112 in the lower half of the interior. It is assumed that pixel values within an annulus of image 106 will be approximately equal unless a defect exists within the annulus. When images 106 and 108 are properly aligned, annular groups 112 correspond to the annuli of inspection points in image 108. Processor 64 then compares each of these differences with a first threshold. If any of these differences exceeds the first threshold, then processor 64 detects a possible defect within the annulus of the interior corresponding to that annular group 112, and identifies a deviant pixel or pixels within that annular group 112.

However, if image 106 is inaccurately aligned with image 108, annular groups 112 will not correspond with the annuli of image 108. That is, an annular group 112 may overlap into multiple annuli of image 108. Thus, the above assumption of alignment will be invalid for annular groups 112. For example, the pixel values of one annulus of image 106 may differ substantially from the pixel values of another annulus. If pixels from these two annuli are erroneously contained within one annular group 112, the differences between pixel values may exceed the first threshold and cause a false defect detection.

To reduce or eliminate false defect detection, processor 64 executes the following inspection algorithm if a potential defect is identified during the above-described initial inspection algorithm. Processor 64 develops pixel-value gradients, which are the differences in value between adjacent pixels, for the radial groups 110 including and surrounding each deviant pixel. Processor 64 calculates these gradients by calculating the differences between consecutive inspection pixel values within these radial groups 110. Processor 64 then compares the gradients for the surrounding radial groups 110 to the gradient of the radial group 110 containing the deviant pixel. If the differences between the gradient for the latter radial group 110 and the gradients for the former radial groups 110 are within a second predetermined threshold, then processor 64 determines that it falsely detected a defect. If one or more of these differences exceed the second predetermined threshold, processor 64 confirms its detection of a defect and notifies strobe processor 86 to remove the defective can 12 from conveyor 14.

For example, suppose the first threshold equals 0.5, the value of inspection pixel 114 equals 0.8, and the value of inspection pixel 116 equals 1.4; thus, the difference between inspection pixel 114 and 116 is 0.6, which exceeds the first threshold. Processor 64 then calculates the average of all inspection pixel values within annular group 112b. In this example, the average equals 0.7. Processor 66 next calculates the differences between the values of inspection pixels 114 and 116 and the average; these differences respectively equal 0.1 and 0.7. The inspection pixel deviating the furthest from the average, here pixel 116, is labeled the deviant inspection pixel. Although in this example only one deviant inspection pixel is found for annular group 112b, it is possible to have multiple deviant pixels in a single annular group 112.

Once processor 64 identifies inspection pixel 116 as the deviant pixel, it calculates the value gradient for inspection pixels in radial group 110a. In this example, the difference between the values of inspection pixels 118 and 116 is 0.2 and the difference between pixels 116 and 120 is −0.2 in an outward direction. Processor 64 then calculates the gradient for analogous pixels in surrounding radial groups 110b and 110c. Between pixels 122 and 124, the difference is 0.3, and between pixels 124 and 126 is –0.1. Between pixels 128 and 130, the difference is 0.2, and between pixels 130 and 132 is –0.3. Thus, for each radial group 110a–c, the deviant pixel 116 and corresponding pixels 124 and 130 are brightness peaks, because the gradient is positive between pixel pairs 116/118, 122/124, and 128/130 and negative between pixel pairs 116/120, 124/126, and 130/132. Assuming the second predetermined threshold is |0.3|, no portions of the radial group 110a gradient exceeds by more than the second threshold corresponding gradient portions in groups 110b–c. Thus, processor 64 detects a similar gradient trend for radial group 110a and surrounding groups 110b–c, and determines there is no defect at deviant pixel 116. If the gradient trends were dissimilar, i.e., portions of the group 110a gradient exceeded by more than the second threshold corresponding portions of the gradient for the radial group 110b or 110c, processor 64 would have detected a defect in the interior corresponding to deviant pixel 116.

Figure 6:
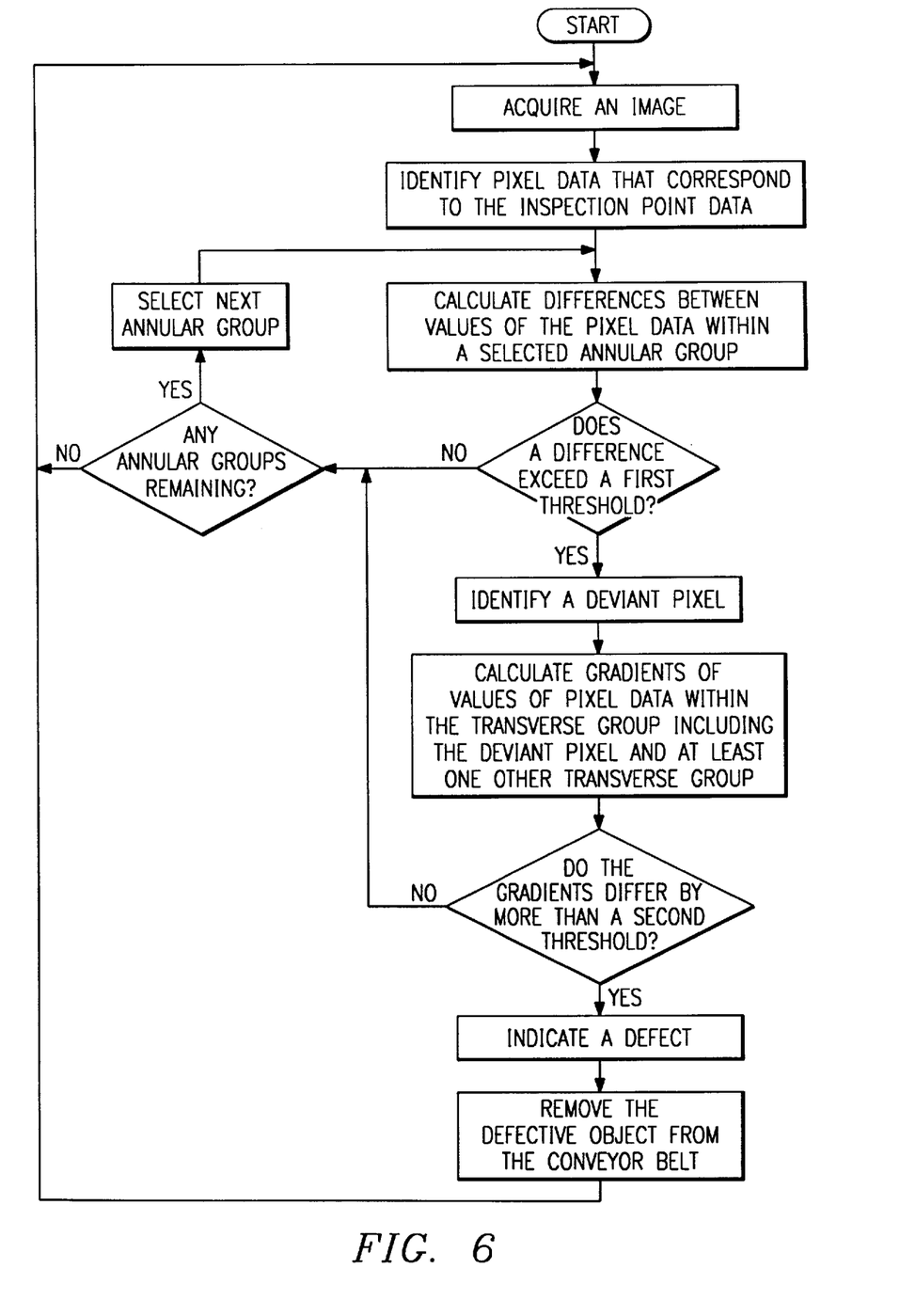
FIG. 6 is a flow chart of an algorithm executed by the processors shown in FIG. 2.

FIG. 6 is a flow chart of the algorithm executed by processors 64, 66, 68, and 70. In actual practice, processor 64 may execute a more complicated defect detection algorithm. For example, processor 64 may process more than two surrounding radial groups 110 or nonsurrounding radial groups 110, and may calculate the gradient for more than three pixels within each radial group 110, even for pixels in lower half 104 of the interior.

Because radial groups 110 and thus the inspection pixels within each annular group 112 are angularly spaced, each annular group 112 contains the same number of inspection pixels regardless of its circumference. That is, an annular group 112 toward the top of the interior (to the outer portion of the image 106) contains the same number of inspection pixels as an annular group 112 toward the bottom of the interior (center of image 106). However, because the optical resolutions of fish-eye lenses 32 and 34 are greater toward the top of the interior, the error-detection resolution of system 10 is approximately the same for each annular group 112. Within each radial group 110, the inspection pixels are spaced farther apart toward the top of the interior to account for the optical resolution gradient of fish-eye lenses 32 and 34.

Typically, the number of inspection pixels, i.e., the angular spacing between inspection pixels, within an annular group 112, is determined by the number of inspection pixels required to give the desired inspection resolution in the annular group 112 for which the respective fish-eye lens 32 or 34 provides the worst optical resolution. For example, if the annular group 112 that is provided with the worst optical resolution requires thirty (30) inspection pixels to provide the desired defect detection resolution, then every annular group 112 is provided with thirty (30) inspection pixels.

Although an annular and radial pattern of inspection pixels is discussed for the present embodiment, other embodiments may use different inspection-pixel patterns for both cylindrical and noncylindrical objects. Generally, an inspection-point pattern is arranged in circuital and transverse groups. For purposes of this description, "circuital groups" have substantially the same shape as the contour of the outer edge of the expected image and lie along substantially closed paths of varying lengths. "Transverse groups" lie along paths angled with respect to the circuital groups and have at least two points, one of which lies outside a circuital group containing the other point.

Figure 7:
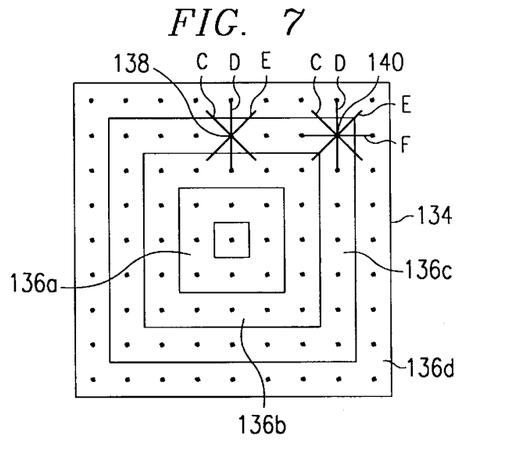
FIG. 7 illustrates a pattern of inspection points for a square image.

FIG. 7 illustrates a square-shaped image 134 having inspection points arranged in annular groups 136a–d. For an inspection point 138 positioned at a location other than a corner of an annular group 136, a transverse group including point 138 may lie along paths having orientations C, D, and E. As discussed above, paths having orientations C, D, and E contain two inspection points adjacent to and on opposite sides of point 138 where at least one of the inspection points lies outside of annular group 136c. (If both oppositely adjacent points lay within annular group 136c, then determining the differences between them and point 138 would yield redundant information, because these differences were previously obtained when annular group 136c was inspected.) As shown, a corner point 140 can belong to transverse groups lying in paths having orientations C, D, E, and F.

In operation, gradients may be calculated for pixel values within transverse groups lying along paths having orientations C, D, or E (or F for corner points). However, it is preferable that only gradients of pixel values within equivalently oriented transverse groups be compared. For example, it is preferable that a gradient of pixel values within a transverse group having a C orientation only be compared with a gradient taken from another transverse group also having a C orientation. Once the annular and transverse groups are arranged, the defect calculation is similar to that for annular groups 112 and radial groups 110 as described in conjunction with FIG. 5.

In still another embodiment of the present invention, a processor within each processor bank 60 and 62 determines the average brightness of each can 12 interior inspected. From each average, processor banks 60 and 62 calculate and store in memory 80 a running average of can brightness over a predetermined number N, of the most recently inspected cans 12.

Strobe processor 86 accesses and uses this running average to automatically adjust the brightness sensitivity of cameras 28 and 30 to a level such that system 10 operates at its optimal defect-detection resolution. Thus, an operator need not shut down conveyer 14 between inspection runs of different types of cans 12 to readjust this sensitivity. Instead, system 10 itself automatically performs this readjustment as the average reflectivities of the different containers 12 vary the running brightness average.

One method for adjusting the brightness sensitivity is to adjust the input voltage ranges of ADCs 44 and 46 to correspond with the expected full-scale voltage ranges output from cameras 28 and 30. For example, suppose processor bank 60 calculates from the running average that the expected output-voltage range of camera 28 is 0 to 0.25 volts. That is, each acquired analog pixel is expected to have a voltage value, which is proportional to the pixel's brightness value, between 0 and 0.25 volts. If ADC 44 has 8-bit resolution, then bank 60 can adjust the input voltage range of ADC 44 such that 0 volts equals 0 and 0.25 volts equals 256. Thus, system 10 can utilize the full resolution of ADC 44.

Another method for adjusting the brightness sensitivity is by controlling the light output from strobes 29 and 31. A pair of sensors (not shown) measure the light energy from strobes 29 and 31 respectively that is reflected back from the interior of a can 12. When the total reflected light energy for that can 12 reaches a predetermined threshold, the sensor cuts off the respective strobe 29 or 31. That is, the higher the reflectivity of the can 12, the shorter the time during which the strobe is activated. Thus, because they are always exposed to approximately the same amount of light energy regardless of the reflectivity of the can 12 or other object, cameras 28 and 30 operate at a relatively constant brightness sensitivity.

Although the present invention and its advantages have been described in detail, it should be understood that various changes, substitutions and alterations can be made therein without departing from the spirit and scope of the invention as defined by the appended claims. For example, system 10 may acquire and inspect an image of the exteriors of containers 12.

What is claimed is:

1. An apparatus for identifying a defective object from an image of said object stored as pixel data, comprising:
   an inspection-point memory for storing inspection-point data for said object, said inspection-point data representing inspection points arranged in circuital and transverse groups;
   a pixel-data memory for storing said pixel data;
   a processor for reading said inspection-point memory and said pixel-data memory, for executing a program for identifying which of said pixel data correspond to said inspection-point data, for calculating differences between values of these corresponding pixel data within said circuital groups, for identifying a deviant pixel if one of said differences exceeds a first threshold, for calculating gradients of values of said corresponding pixel data within a transverse group including said deviant pixel and within at least one other transverse group, and for determining whether said gradients differ by more than a second threshold; and
   a program memory for storing said program.

2. The apparatus of claim 1 wherein said inspection points are spaced farther apart proceeding in a direction from the center toward the outer portion of said image to compensate for the increasing resolution of said image from said center toward said outer portion.

3. The apparatus of claim 1 wherein said object is substantially cylindrical, said circuital groups are arranged as rings, and said transverse groups are arranged as radials.

4. The apparatus of claim 1 further comprising:
   a camera for acquiring said image, said camera equipped with a fish-eye lens for transforming a view of the interior of said object into a two-dimensional view.

5. The apparatus of claim 1 wherein said inspection-point memory is a look-up table.

6. The apparatus of claim 1 wherein said object and said circuital groups are substantially square.

7. The apparatus of claim 1 further comprising a camera for acquiring said image,
   wherein said processor adjusts the sensitivity of said camera to correspond with the average of values of said corresponding pixel data taken over a plurality of objects.

8. An apparatus for detecting a defect within the interior of a generally cylindrical container from an image of said interior stored as pixel data, comprising:
   a plurality of look-up tables for permanently storing inspection-point data for said interiors, said inspection-point data representing inspection points arranged in annular and radial groups;
   a buffer for storing said pixel data;
   a processor for reading said inspection-point data from said look-up tables and for reading said pixel data from said buffer, for executing a program for identifying which of said pixel data correspond to said inspection-point data, for calculating differences between values of these corresponding pixel data within said annular groups, for identifying a deviant pixel if one of said differences exceeds a first threshold, for calculating gradients of values of said corresponding pixels within a radial group including said deviant pixel and within at least one other radial group, and for determining whether said gradients differ by more than a second threshold; and
   a memory for storing said program.

9. The apparatus of claim 8 wherein said inspection points are spaced farther apart in a direction proceeding from the bottom toward the top of said interior to compensate for the increasing resolution of said image from said bottom to said top.

10. The apparatus of claim 8 further comprising:
    a camera for acquiring said image, said camera equipped with a fish-eye lens for transforming a view of said interior into a two-dimensional view.

11. The apparatus of claim 8 further comprising:
    a camera for acquiring said image, said camera having a view; and
    a strobe for illuminating said interior while said container is within said view.

12. The apparatus of claim 8 further comprising a camera for acquiring said image, said camera equipped with a filter for compensating for brightness differences between portions of said interior.

13. The apparatus of claim 8 further comprising a camera for acquiring said image, wherein said processor adjusts the sensitivity of said camera to correspond with the average values of said corresponding pixel data taken over a plurality of interiors.

14. A method for identifying a defective object from an image of said object stored as pixel data, comprising:
    storing inspection-point data representing inspection points arranged in circuital and transverse groups at locations on said object;
    storing said pixel data;
    identifying which of said pixel data correspond to said inspection-point data, thereby obtaining inspection-pixel data;
    calculating differences between values of said inspection-pixel data within at least one of said circuital groups;
    identifying a deviant pixel if at least one of said differences exceeds a first threshold;
    calculating gradients of values of said inspection-pixel data within a transverse group including said deviant pixel and within at least one other transverse group; and
    determining whether said gradients differ by more than a second threshold.

15. The method of claim 14 further comprising spacing the inspection points farther apart proceeding in a direction from the center toward the outer portion of said object to compensate for the increasing resolution of said image from said center toward said outer portion.

16. The method of claim 14 wherein said object is substantially cylindrical, further comprising:
    arranging said circuital groups as rings; and
    arranging said transverse groups as radials.

17. The method of claim 14 further comprising acquiring said image with a camera equipped with a fish-eye lens for transforming a view of said object into a two-dimensional view.

18. The method of claim 14 wherein said step of storing inspection-point data comprises storing said inspection-point data in a look-up table.

19. The method of claim 14 wherein said object is substantially square, further comprising arranging said circuital groups as squares.

20. The method of claim 14 further comprising:
    acquiring said image with a camera; and
    adjusting the sensitivity of said camera to correspond with the average of values of said inspection-pixel data taken over a plurality of objects.

* * * * *